(12) United States Patent
Gould et al.

(10) Patent No.: US 7,713,309 B2
(45) Date of Patent: *May 11, 2010

(54) SYSTEM AND METHOD FOR DETECTING AND REPORTING CABLE NETWORK DEVICES WITH DUPLICATE MEDIA ACCESS CONTROL ADDRESSES

(75) Inventors: Kenneth Gould, Oakton, VA (US); Christopher Pierce Williams, Potomac Falls, VA (US)

(73) Assignee: Time Warner Cable, a division of Time Warner Entertainment Company, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/267,384

(22) Filed: Nov. 7, 2008

(65) Prior Publication Data

US 2009/0070800 A1    Mar. 12, 2009

Related U.S. Application Data

(62) Division of application No. 10/719,836, filed on Nov. 21, 2003, now Pat. No. 7,512,969.

(51) Int. Cl.
*G08B 29/00* (2006.01)
*H04N 7/16* (2006.01)
*G08B 13/00* (2006.01)
*G08B 21/00* (2006.01)
(52) U.S. Cl. ............................. 726/35; 380/239; 725/25
(58) Field of Classification Search ................ 380/239; 725/25; 726/35
See application file for complete search history.

(56) References Cited

U.S. PATENT DOCUMENTS

| 5,467,382 | A | 11/1995 | Schorman |
| 5,724,510 | A | 3/1998 | Arndt et al. |
| 5,884,024 | A | 3/1999 | Lim et al. |
| 6,018,767 | A * | 1/2000 | Fijolek et al. ............... 709/218 |
| 6,195,689 | B1 | 2/2001 | Bahlmann |
| 6,393,484 | B1 | 5/2002 | Massarani |

(Continued)

OTHER PUBLICATIONS

Droms, RFC 2131: Dynamic Host Configuration Protocol,: Mar. 1997, http://www.ietf.org/rfc2131.txt?number=2131.

(Continued)

*Primary Examiner*—Michael J Simitoski
(74) *Attorney, Agent, or Firm*—The Marbury Law Group, PLLC (57) ABSTRACT

The detection of devices with duplicate media access controller (MAC) addresses in a cable network. A cable network device (CND) having a MAC address is connected by the cable network to a cable modem termination system (CMTS) having a gateway interface address. A centralized storage of historical cable modem MAC address/giaddr tuple data is used to identify CNDs that report duplicate MAC addresses. The cable network tracks the CND MAC address/giaddr tuple data of all CND requests that it receives and stores the MAC address/giaddr tuple data into a datastore (such as a database). When a CND seeks to access the network, the cable network looks into the datastore to determine whether the CND MAC address of the CND has previously been stored with a different associated giaddr, which would imply that there are multiple CNDs attached to different CMTSs where the CNDs share the same MAC address. If such duplication is detected, an appropriate remedial response is taken.

15 Claims, 7 Drawing Sheets

U.S. PATENT DOCUMENTS

| | | |
|---|---|---|
| 6,466,986 B1 | 10/2002 | Sawyer et al. |
| 6,493,340 B1 | 12/2002 | Kawanaka |
| 6,603,758 B1 | 8/2003 | Schmuelling et al. |
| 6,618,386 B1 | 9/2003 | Liu et al. |
| 6,654,387 B1 | 11/2003 | Beser et al. |
| 6,697,862 B1 | 2/2004 | Beser et al. |
| 6,745,333 B1 | 6/2004 | Thomsen |
| 6,859,826 B2 | 2/2005 | Bahlmann |
| 7,114,070 B1 | 9/2006 | Willming et al. |
| 7,272,846 B2 | 9/2007 | Williams et al. |
| 7,290,046 B1 | 10/2007 | Kumar |
| 2002/0023160 A1 | 2/2002 | Garrett et al. |
| 2002/0023174 A1 | 2/2002 | Garrett et al. |
| 2002/0165972 A1 | 11/2002 | Chien et al. |
| 2004/0103314 A1 | 5/2004 | Liston |
| 2006/0104280 A1 | 5/2006 | Carolan et al. |

OTHER PUBLICATIONS

Staniford et al., "How to Own the Internet in Your Spare Time," Proceedings of the 11$^{th}$ USENIX Security Symposium (Security '02), Aug. 8, 2002.

Thomson, S., et al. "IPv6 Stateless Address Autoconfiguration." RFC 2462, Dec. 1998.

Jones, D., et al. "The DOCSIS (Data-Over-Cable Service Interface Specifications) Device Class DHCP (Dynamic Host Configuration Protocol) Relay Agent Information Sub-Option." RFC 3256, Apr. 2002.

Patrick, M. "DHCP Relay Agent Information Option." RFC 3046, Jan. 2001.

\* cited by examiner

SYSTEM AND METHOD FOR DETECTING AND REPORTING CABLE NETWORK DEVICES WITH DUPLICATE MEDIA ACCESS CONTROL ADDRESSES

This application is a divisional application of U.S. application Ser. No. 10/719,836, filed Nov. 21, 2003, now U.S. Pat. No. 7,512,969, which application is incorporated by reference for all purposes and from which priority is claimed.

BACKGROUND

The present invention relates generally to the field of network management. More particularly, the present invention permits the detection of cable modems and cable network devices with duplicate media access controller (MAC) addresses.

Every network interface has a media access controller (MAC) address, also known as the physical address. This is the actual hardware address that the lowest level of the network uses to communicate. In cable networks, the MAC address is used to assign an Internet protocol (IP) address to a device by means of a dynamic host configuration protocol (DHCP) server. The MAC address is theoretically unique to a particular device. This permits an IP network service provider to use the MAC address as a vehicle for authorizing access to its network and further aids in billing users for services.

A cable network comprises a variety of cable network devices, including cable modems (CMs) and cable modem auxiliary devices (CMADs) such as multimedia terminal adapters (MTAs) and two-way set top boxes (STBs). Each of these devices is assigned an IP address by the cable network based on the MAC address of the device. Ideally, at the time of manufacture, each cable network device (e.g., a CM, MTA, set top box among others) is assigned a MAC address that uniquely identifies that device. Either through error at the time of manufacture, or through malicious intent (hacking), a cable network device may appear on a cable network with a MAC address that has already been assigned to another cable network device. As the MAC address is often the sole identifier used to identify and authenticate a cable network device for network connectivity, programming delivery and billing purposes, it is imperative to guarantee the uniqueness of the MAC address for each cable network device in order to thwart "theft of services."

In the cable environment, access to the cable network's data service is provided to CMADs through a cable modem (CM). Increasingly, CMs are required to comply with an industry standard referred to as the "Data Over Cable Service Interface Specification" or DOCSIS. DOCSIS provides a set of standards and a certifying authority by which cable companies can achieve cross-platform functionality in Internet delivery. A DOCSIS compliant cable network comprises cable modem termination systems (CMTSs) and cable modems that form the interface to an Internet service provider (ISP). The CM provides two-way connectivity between a customer and the ISP through the CMTS. A cable modem termination system (CMTS) is a component that exchanges digital signals with CMs on a cable network.

High-speed data (HSD) service is delivered to a subscriber through channels in a coaxial cable to a CM. An upstream channel is used to communicate from the CM to the CMTS. A downstream channel handles communication from the CMTS to the CM. When a CMTS receives signals from the CM, the CMTS converts these signals into Internet Protocol (IP) packets, which are then sent to an IP router for transmission across a managed IP network. When a CMTS sends signals to a cable modem, the CMTS modulates the downstream signals for transmission across the cable to the CM.

The provisioning of the CM is an example of an authentication process. A DHCP server associated with a CMTS uses the CM MAC address to determine whether a customer is authorized to receive HSD service via the CM (based on finding the MAC address in a provisioning/authentication database) and what level of service an authorized subscriber is entitled to receive. In a cable network with a single CMTS, the CMTS will deny an attempt by a CM to present a MAC address that is currently registered by that CMTS. However, if the cable network utilizes multiple CMTSs and if the second use of the MAC address is presented to a CMTS that is not the CMTS that registered the first instance of that MAC address, the duplicated MAC address will not be detected.

With the development of packet switching and the growth of the Internet, interest in real-time services, such as voice over IP (VoIP) and gaming using packet switching technology has grown. Real-time services over cable are subject to a variety of standards, including the various standards issued by Cable Television Laboratories, Inc. under the "PacketCable™" standard. The standards are directed to end-to-end functions, including signaling for services, media transport at variable QoS levels, security, provisioning of the client device, billing, and other network management functions. VoIP is the first service defined for this platform, but others are expected to follow. PacketCable services utilize a subscriber's CM and a multimedia (or media) terminal adapter (MTA). The MTA is connected between the CM and other subscriber equipment. For VoIP service, for example, the MTA connects to a standard telephone and handles voice compression, packetization, security, and call signaling. An MTA may be designed to be either a separate standalone device or to be embedded within the CM. The MTA and the CM are assigned separate media access control (MAC) and IP addresses, even if the elements are integrated into a single device. Typically, the MAC address of the MTA component of an integrated MTA/CM device is the MAC address of the CM component plus 1. The CMTS uses the Data Over Cable Service Interface Specification (DOCSIS) protocol (also issued by Cable Television Laboratories, Inc.) on the access network to manage access network resources for PacketCable services.

The DHCP server uses the MTA MAC address and the CM MAC address to determine whether an HSD service customer is entitled to receive PacketCable services through the MTA. In determining whether to authorize the MTA, the CM MAC is checked to see if the MTA DHCP request came through a CM that is entitled to data and voice service. The MTA MAC is also checked by the DHCP server to see what kind (make and model) of MTA is making the request so that the MTA can be told to request the appropriate type of MTA configuration file (which may contain make/model specific instructions). However, while it has been suggested that the relationship between the CM MAC and the MTA MAC can be exploited to police service theft, no system today checks to see if the two MAC addresses "belong" to each other.

Because the MTA is not "registered" by the CMTS before the MAC address is presented to the DHCP server, duplicate MTA addresses may not be detected even on a system with a single CMTS if used behind different CMs.

The two-way set-top box (STB) is another example of a CMAD that is provisioned by the cable network with an IP address based on the MAC address of the STB. The STB utilizes an integrated cable modem (which is provisioned in the same manner as a standalone CM) to communicate with a DHCP server, and receives its IP address based on both the integrated CM's and STB's MAC addresses. As in the case of the MTA, a duplicate STB MAC address can operate behind two or more legitimate CM MAC addresses without being detected.

In cable networks comprising regional networks, the detection of multiple MAC addresses from cable network devices is more difficult. CMs, for example, may present the same MAC addresses to different CMTS within a regional network or across different regional networks.

The consequences of allowing cable network devices with duplicate MAC addresses to operate on a cable network can be significant. If a "rogue" cable modem, MTA or other cable network device were to share the same MAC address as a legitimate cable network device, the "rogue" device would receive the same service as the legitimate device. If the legitimate device user is charged for service based upon the quantity of service used, it is likely that the legitimate user will be charged for the services utilized by the "rogue" device. Resolving payment disputes is costly for the cable service provider and, at a minimum, annoying and inconvenient for its subscribers.

As noted above, a cable network in which a single DHCP server supports a CMTS provides some level of protection against duplication of MAC addresses by CMs. CMs are identified to the cable network through an initialization process managed by the CMTS. The CM is initialized with the CMTS through a series of handshakes that comprise an exchange of data. When a CM is powered on, it scans the cable network for a downstream data channel carrying a signal that the CM recognizes as coming from the CMTS. The signal from the CMTS comprises an instruction set used by the CM module to communicate with the CMTS. The CM receives and implements the instruction set and then obtains from the CMTS parameters identifying available upstream channels on which the device may transmit. Other operational parameters are acquired and the CM is registered on the cable network.

In this provisioning example, the CM sends a dynamic host configuration protocol (DHCP) request to the CMTS for an Internet protocol (IP) address and other parameters. The IP address enables the CM to establish its identity for receiving the downstream data addressed to it and for transmitting data from a known Internet address. The request includes the MAC address of the CM. If the MAC address of the CM is not associated with a previously registered CM, the CMTS forwards the CM's request for the IP address to the DHCP server assigned to that CMTS. This server contains a database or pool of IP addresses allocated to the Internet devices on the network. The DHCP server responds through the CMTS with an IP address and other necessary data. The CM extracts this data from the message and immediately configures its IP parameters.

As noted, the DHCP request message contains the CM's MAC address. The CMTS receives the DHCP request and adds its own unique identifier (typically referred to as a gateway interface address or "giaddr") to the DHCP request. The giaddr identifies the CMTS through which the CM is communicating and is used by the DHCP server to determine from which pool of IP addresses a specific IP address for CM will be selected. Thus, an intended function of the giaddr is to aid in the assignment of IP addresses.

The CMTS maintains a list of CM MAC addresses for CMs that are currently registered with the CMTS. If a CM is registered and another CM with the same MAC address as the first CM attempts to register with that CMTS, the CMTS will typically reject the second CM's registration attempt. Note that there is no mechanism for the CMTS to determine which of the CMs is the "rightful owner" of the CM MAC address. It can only determine that a CM is attempting to register with a MAC address with which another CM is currently registered.

The provisioning process for CMAD (e.g., an MTA) differs from the process experienced by the CM in that the CMAD provisioning is not managed by the CMTS, and the CMAD is not registered with the CMTS before presenting its MAC address to a DHCP server. Rather, the CMAD is provisioned after the CM has been authorized by the CMTS and assigned an IP address by the DHCP server. For example, two MTAs presenting the same MTA MAC address via different CMs presenting different and valid CM MAC addresses will not be detected by the CMTS. As noted, the DHCP request from the MTA comprises the MAC address of the MTA and the MAC address of the CM to which the MTA is connected. It has been suggested that the MTA MAC address be associated with the CM MAC address to detect use of a single MTA with multiple CMs. No specific implementations of this suggestion have been found. Even if implemented, this association does not address the problem of detecting unauthorized MTA usage when the cable network comprises multiple CMTSs or multiple networks each with its own CMTS and DHCP server support.

What is needed are means for identifying cable network devices having the same MAC address on a single CMTS or multiple CMTSs, either as part of single network or as part of multiple networks within a cable network.

SUMMARY

An embodiment of the present invention is a method for detecting cable network devices (CNDs) that have the same MAC address. For the purposes of this application, a CND is a cable network device that receives an IP address from an appropriate provisioning system based on the MAC address of the device. A cable modem (CM) is a special type of CND that establishes data communication channels on the cable network and that is registered with a CMTS before it is provisioned with an IP address. Other CNDs connect to the CM to utilize the data communication channels of the CM. These CNDs are referred to as cable modem auxiliary devices (CMADs) and comprise media terminal adapters (MTAs) and two-way set top boxes (STBs), among others. CMADs are not registered with the CMTS.

The MAC address of the CND is associated with the giaddr of the CMTS to which the device is connected to form a MAC address/giaddr tuple. A datastore stores historical MAC address/giaddr tuple data. In one embodiment of the present invention, that datastore comprises a central database. In an alternative embodiment, the datastore comprises a distributed database. By comparing the MAC address/giaddr tuple data of the CND seeking to access a cable network to the MAC address/giaddr tuple data in the datastore, duplicate MAC addresses can be detected and managed.

In an exemplary embodiment of the present invention, the CND is a cable modem (CM). In still another exemplary embodiment of the present invention, the CND is a media terminal adapter (MTA). However, the present invention is not so limited. As will be apparent to those skilled in the art, any CND that is provisioned by the cable network with an IP address is within the scope of the present invention. By way of illustration, in another exemplary embodiment, the CND is a set-top box.

It is therefore an aspect of the present invention to detect and identify CNDs having the same MAC address.

It is another aspect of the present invention to detect an attempt over a cable network to capture a legitimate MAC address by a user of a CND that is not entitled to receive service from the cable operator.

It is still another aspect of the present invention to associate a CND with a primary cable modem termination system (CMTS).

It is yet another aspect of the present invention to associate the MAC address of an MTA with the MAC address of a CM and with a primary CMTS.

An embodiment of the present invention is a method for detecting multiple CMADs that have the same MAC address. A CMTS receives a DHCP request comprising a MAC address of a CMAD seeking access to the cable system and a MAC address of a CM to which the CMAD is connected. The CMTS forms a proffered identifier of the CMAD by combining a gateway interface address of the CMTS with the CM MAC address and the CMAD MAC address. The components of the proffered identifier are compared to the components of each of one or more stored identifiers stored in a datastore. A determination is made whether the proffered identifier and any of the one or more stored identifiers satisfy first matching criteria comprising a same CMAD MAC address component and a different gateway interface address component. In the event the proffered identifier and any of the one or more stored identifiers satisfy the first matching criteria, a remedial response is selected.

In the event the proffered identifier and any of the one or more stored identifiers do not satisfy the first matching criteria, a determination is made whether the proffered identifier and any of the one or more stored identifiers satisfy a second matching criteria comprising a same CMAD MAC address component, a different CM MAC address component, and a same gateway interface address component. In the event the proffered identifier and any of the one or more stored identifiers satisfy the second matching criteria, a remedial response is selected.

In another embodiment of the present invention, the cable system comprises a plurality of regional networks. Each regional network comprises a regional datastore. The cable system further comprises a central datastore in which data from all of the regional datastores reside. In this embodiment, the first and second matching criteria are applied regionally using data stored in the regional datastore of the regional network to which the CMAD is connected. If the proffered identifier satisfies the first and second matching criteria on a regional basis, the first and second matching criteria are applied to the proffered identifier using data stored in the central datastore. In this way, the duplicate MAC addresses of CMADs can be detected across discrete networks.

In an exemplary embodiment, the CND is a CM. In this exemplary embodiment, a plurality of CMTSs is serviced by a single DHCP server. A centralized storage of historical CM MAC address/giaddr tuple data is used to identify CMs with duplicate MAC addresses. The DHCP server tracks the CM MAC address/giaddr tuple data of all DHCP requests that it receives and stores the CM MAC address/giaddr tuple data in a datastore (such as a database). When a DHCP request is received from a CM, the DHCP server looks into the datastore to determine whether the CM MAC address in the DHCP request has previously been associated with a different giaddr (using the first matching criteria described above). If this has occurred, it would imply that one of three events has occurred: (1) the CM has been physically moved to a different part of the cable infrastructure so that it is connecting through a different CMTS; (2) the CM has been assigned to a new CMTS to accommodate a change in the system structure (as, for example where a new CMTS has been added to account for subscriber count growth); or (3) there are CMs with the same MAC address each requesting an IP address through different CMTSs attached to the DHCP server. When such duplication is detected, the DHCP server takes a prescribed remedial response (e.g., denies the duplicate registration or permits the duplicate registration on a temporary basis) and sends a message to an error log and to a monitoring system that alerts support personnel. For CMs with MAC addresses for which the DHCP has not previously issued an IP address, the DHCP server will write the MAC address/giaddr tuple data to the datastore.

In an alternate embodiment, the CND MAC address/giaddr tuple data is periodically gathered from the plurality of CMTSs and stored in the datastore. In another embodiment, the DHCP server does not perform the tasks of storing the MAC address/giaddr tuple data in the datastore, identifying duplicate MAC addresses, and generating alarms for support personnel. Rather, in this embodiment, these tasks are assigned to a separate detection server so as to avoid overburdening the DHCP server.

In yet another embodiment of the present invention a multiple service operator (MSO) uses a regionalized provisioning system to validate customers. (An MSO is a service provider that operates two or more distinct cable networks.) The CND MAC address/giaddr tuple data is gathered from each distinct network and replicated in a centralized datastore. A process monitors this centralized datastore to detect duplicate MAC addresses that are associated with different CMTSs (using the same or differing DHCP servers) and to alert support personnel appropriately. In this way, the duplicate MAC addresses of CNDs can be detected across discrete networks.

In another exemplary embodiment, the CND is an MTA. In this exemplary embodiment, the MTA MAC is associated with both the MAC address of the CM through which the MTA is connected to the cable network and the CMTS giaddr. This tuple is used to identify MTAs with duplicate MAC addresses. The DHCP server looks into the datastore to determine whether the MTA MAC address embedded in the DHCP request has previously been stored in association with a different CM MAC address, or if the MTA MAC address has been associated with a different giaddr. If either of these associations is detected, the attempt to access the network by the MTA is identified as unauthorized and remedial action is taken.

In yet another embodiment, DHCP logs are parsed to perform historical trending. A log processor looks for patterns to determine whether a "rogue" CND user is changing his CND MAC address over and over again in an attempt to find a legitimate CND MAC address that will allow his CND to become provisioned. This process examines the DHCP logs and looks for unusually high numbers of DHCP failures due to CNDs with MAC addresses that the provisioning system does not recognize. The process also looks for patterns among all MAC addresses that fail in order to determine the location of a "rogue" CND (based upon which individual CMTS the rogue CND is attempting to provision through), as well as to determine the methods being used by the abuser. In an alternate embodiment, historical trending is used to determine the validity of a MAC address proffered by a CND attempting to access a cable system.

In still another embodiment of the present invention, the centralized data store associates a MAC address of a CND with the first CMTS to which the CND communicates its MAC address. If that MAC address is subsequently communicated to a different CMTS (as determined by the giaddrs), a response may be taken to determine whether either or both of the uses of the MAC address are by a legitimate user using a single CND in different locations or on different networks or if the MAC address is being used by different CNDs. In this embodiment, the initiation of a response is not dependent upon the simultaneous use of the same MAC address by different CNDs.

For example, a legitimate user may move a CND from one regional network to another regional network of an MSO. In this example, the detection of the CND MAC address from the CMTS of the second regional network would provoke a remedial response from the MSO. The nature of the remedial response is within the discretion of the MSO. By way of illustration and not as a limitation, the CND could be granted temporary access and sent a confirmation message by the MSO requesting the CND user to respond with a confirmation code. If the CND user fails to respond or if the confirmation code is in error, the temporary access would be terminated. Otherwise, the temporary access is upgraded to "normal" access. As would be apparent to those skilled in the art, other remedial responses may be initiated by the MSO without departing from the scope of the present invention.

In an alternative embodiment, when a new subscriber is issued a CND, the MAC address of the CND and giaddr of the CMTS to which the new subscriber is assigned are saved in a datastore. When the new subscriber first connects to the network, the CND sends a DHCP request to the DHCP server. In this embodiment, the DHCP server looks into the datastore to determine whether both the CND MAC address(es) embedded in the DHCP request and the giaddr match the values assigned to them when the CND was issued. If not, a prescribed remedial response is taken. If the CND MAC address and the giaddr match, the CND is granted temporary access and sent a confirmation message requesting the CND user to respond with a confirmation code. If the CND user fails to respond or if the confirmation code is in error, the temporary access is terminated. Otherwise, the temporary access is upgraded to "normal" access.

DETAILED DESCRIPTION

The following terms are used in the description that follows. The definitions are provided for clarity of understanding:

| | |
|---|---|
| CM - | a cable modem. |
| CMAD - | a cable modem auxiliary device. |
| CMTS - | a cable modem termination system. |
| CND - | a cable network device, including cable modems and cable modem auxiliary devices. |
| DHCP server - | a dynamic host configuration protocol server. |
| DOCSIS - | "Data Over Cable Service Interface Specification" issued by Cable Television Laboratories, Inc. |
| giaddr - | the gateway interface address of a CMTS. |
| HSD - | high-speed data (HSD) service. |
| ISP - | an Internet service provider (ISP). |
| MAC address - | the media access controller address of a CND. |
| MSO - | multiple service operation. |
| MTA - | a multimedia (or media) terminal adapter (MTA) and an example of a CM AD. |
| QoS - | quality of service. |
| STB - | set top box and example of a CMAD. |
| VoIP - | voice over IP. |

Figure 1:
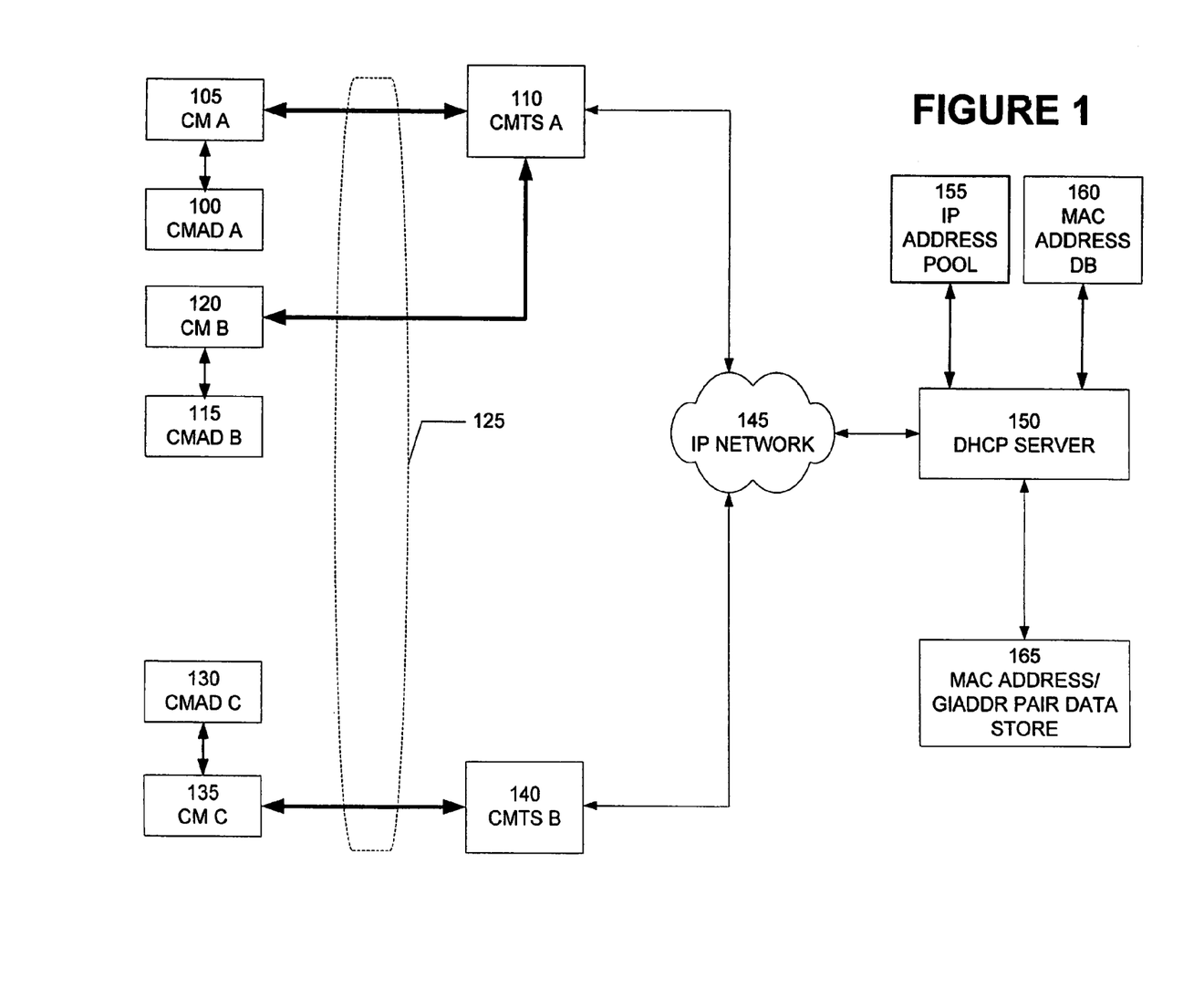
FIG. 1 is a block diagram illustrating an embodiment of the present invention in which duplicated MAC addresses are detected in a single network using a plurality of CMTSs.

An embodiment of the present invention is a method for detecting multiple CNDs that have the same MAC address. FIG. 1 is a block diagram illustrating an embodiment of the present invention in which duplicate MAC addresses are detected on a single cable network using a plurality of CMTSs. Referring to FIG. 1, cable modem auxiliary device A (CMAD A) 100 is connected to a CM A 105. CM A 105 interfaces with CMTS A 110 via cable network 125. Similarly, CMAD B 115 is connected to a CM B 120, which connects to CMTS A 110 via cable network 125. Additionally, CMAD C 130 is connected to a CM C 135, which connects to CMTS B 140 via cable network 125.

The CMADs (CMAD A 100, CMAD B 115, and CMAD C 130) and the CMs (CM A 105, CM B 120, and CM C 135) are cable network devices (CNDs). Each CND is identifiable on the network by a unique MAC address assigned to the CND at the time of manufacture. Additionally, CMTS A 110 and CMTS B 140 are each identified by a unique gateway interface address (a "giaddr"). CMTS A 110 and CMTS B 140 interface with an IP network 145. Connected to IP network 145 are DHCP server 150 and a datastore 165. Datastore 165 stores MAC address/giaddr tuple data of CNDs that have been authorized to access cable network 145. Additionally, the DHCP server 150 is connected to IP address pool 155 and MAC address database 160. In an embodiment of the present invention, the MAC address of a CND is entered into the MAC address database 160 when that CND is assigned to a service subscriber by the operator of cable network 125.

As previously described, a DHCP request is issued by the CND to the CMTS. The DHCP request comprises the MAC address of the CND. The CMTS passes the DHCP request on to the DHCP server 150, which selects an IP address for the CND based on the CMTS that the CND uses for its network connection.

As illustrated in FIG. 1, CMTS A 110 serves both CM A 105 and CM B 120. As previously noted, a CM presents its MAC address to its serving CMTS during a registration process that occurs before the CM issues a DHCP request. The CMTS will refuse registration to a CM if that CM presents a MAC address that is duplicative of the MAC address of a previously registered CM. For purposes of this discussion, both CM A 105 and CM B 120 are each deemed to have been registered with CMTS A 110 with different MAC addresses.

Because CM C 135 is registered with CMTS B 140, the current art will not detect or prevent CM C 135 from sending a DHCP request comprising the same MAC address as either CM A 105 and CM B 120. Because both of these MAC addresses are stored in MAC address database 160, either MAC address would be sufficient to grant CM C 135 an IP address.

As will be described below, the embodiment of the present invention illustrated in FIG. 1 overcomes this problem with the current art.

Figure 2A:
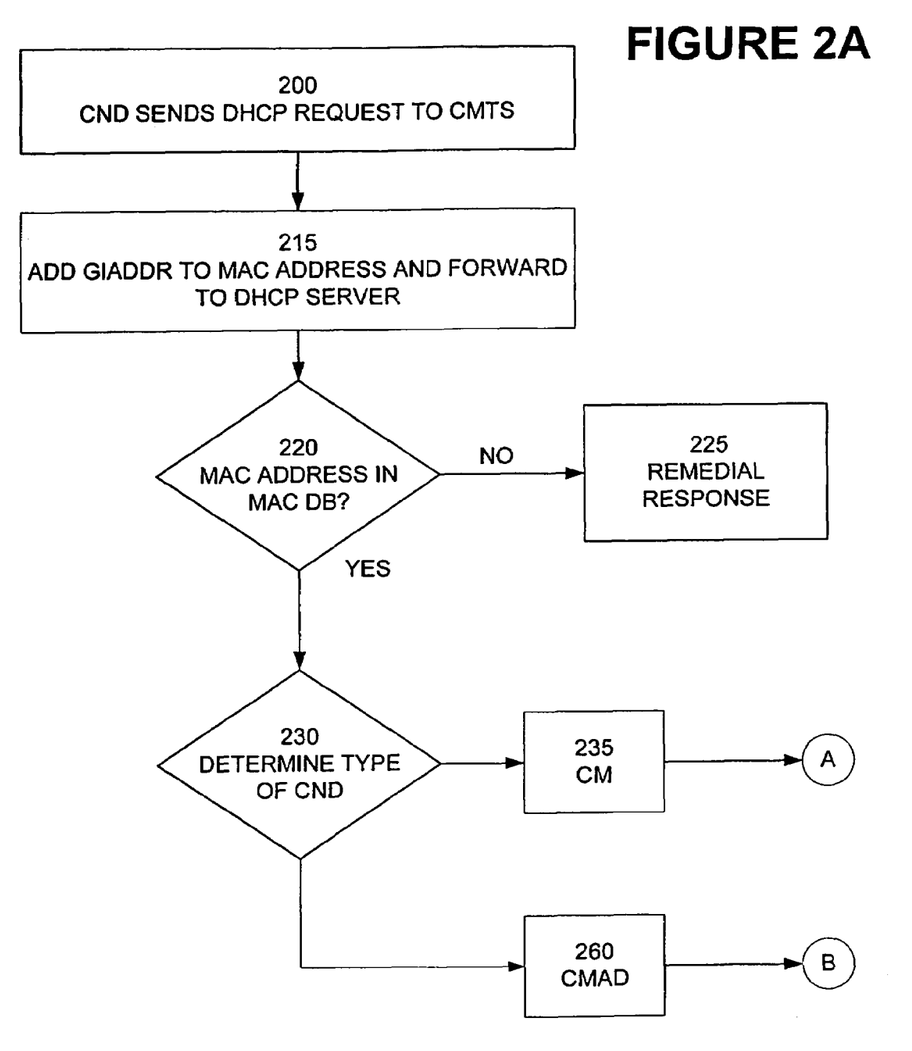
FIGS. 2A, 2B, and 2C illustrate a process according to an embodiment of the present invention by which duplicate MAC addresses are detected in a single network using a plurality of CMTSs.
Figure 2B:
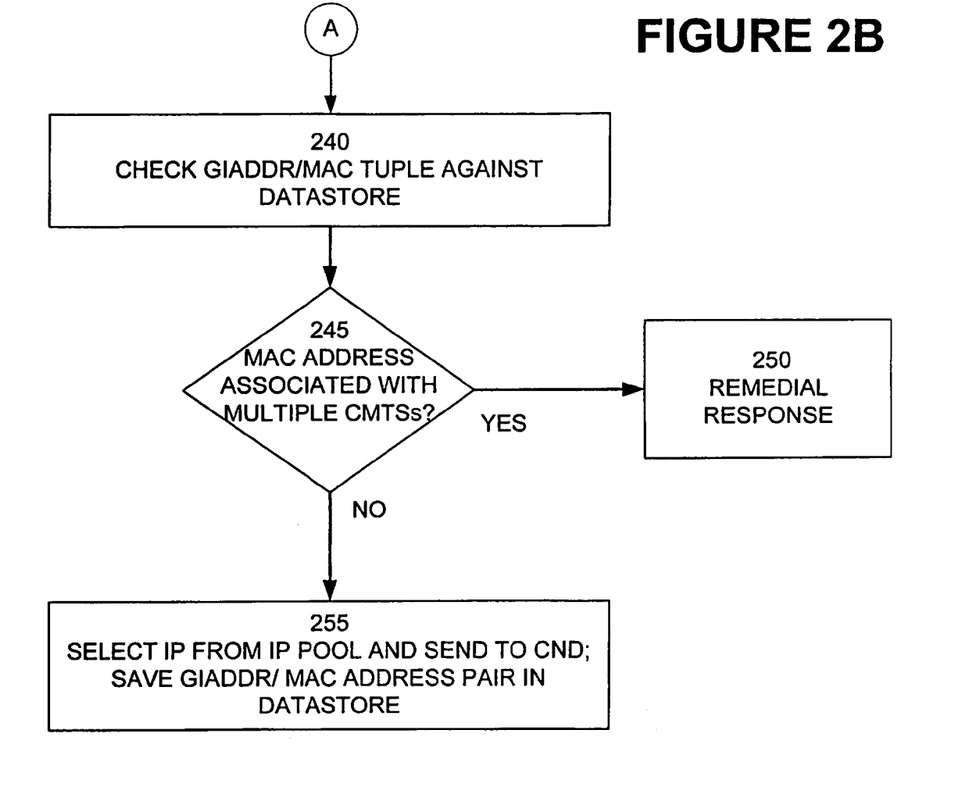
Figure 2C:
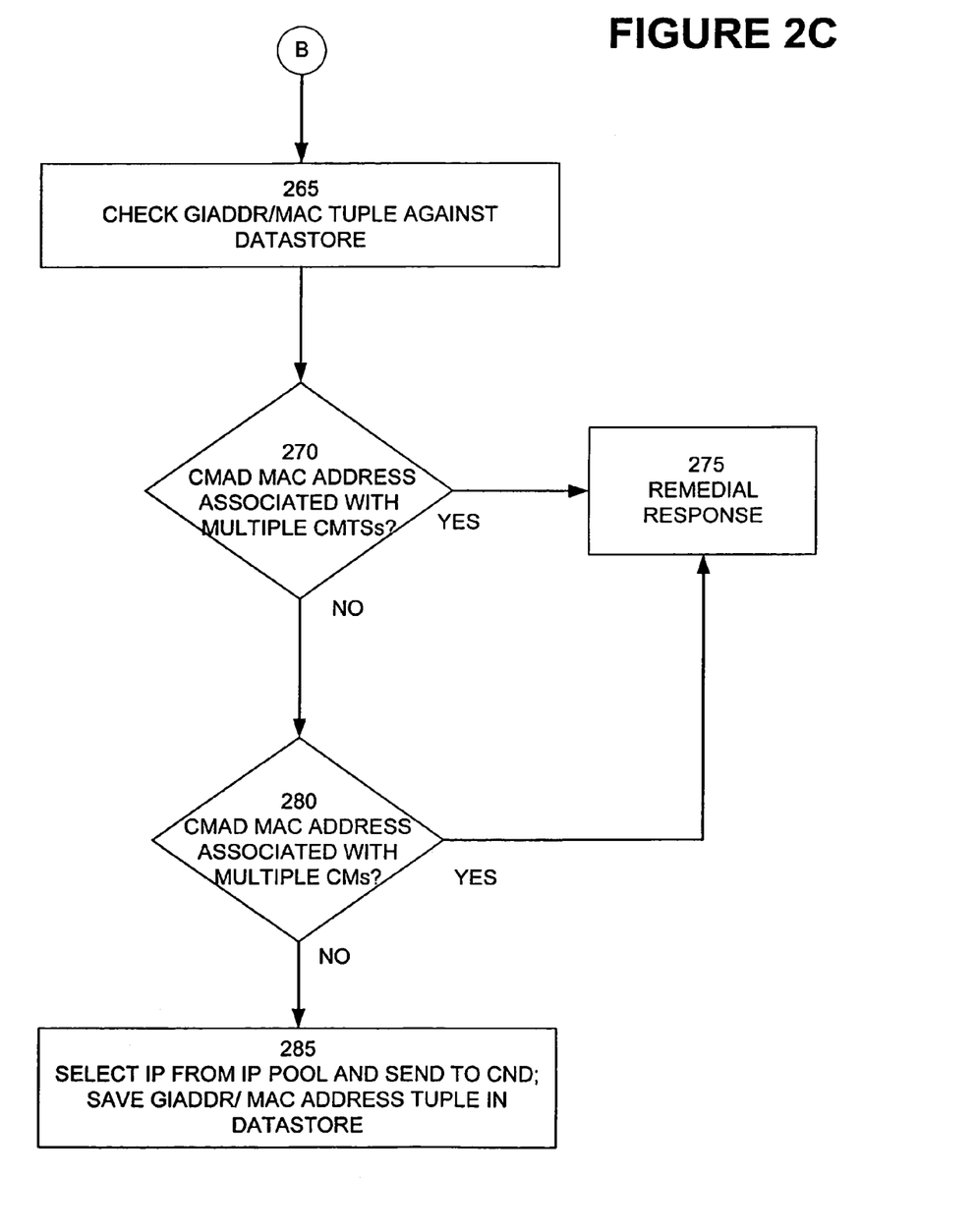

FIGS. 2A, 2B, and 2C illustrate a process according to an embodiment of the present invention of detecting duplicate MAC addresses using DHCP requests from cable network devices (CNDs). As described in the context of FIG. 1, a CM issues a DHCP request only after the CM has successfully registered with the CMTS to which it is connected. The CMTS will refuse registration to a CM if that CM presents a MAC address that is duplicative of the MAC address of a previously registered CM. The process illustrated in FIGS. 2A, 2B, and 2C is true for all CNDs (including registered CMs) because only a registered CM can present a DHCP request.

Referring to FIG. 2, a CND sends a DHCP request to the CMTS 200. The CMTS adds a giaddr to the DHCP request and routes the request to a DHCP server 215. As previously indicated, the content of the DHCP request depends on the CND that sends it. A DHCP request from a CND comprises the CND MAC address. In the case of a CM, the CND MAC address is the MAC address of the CM. The DHCP request of a CMAD (e.g., an MTA or STB) comprises a MAC address pair consisting of the CM MAC address to which the CMAD is connected and the CMAD MAC address. The CND MAC address is the MAC address of the CMAD. The DHCP server determines whether the CND MAC address is in the MAC database 220. If the CND MAC addresses are not in the MAC database 220, a remedial response is taken 225. The network administrator determines what an appropriate remedial response is. Typically, where the CND MAC address is not in the CND MAC database 220, the user is denied service. However, the invention is not so limited and other actions may be taken (such as continuing monitoring for fraud source and pattern detection) without departing from the scope of the invention.

If the CND MAC address is in the MAC database 220, a determination of the type of CND is made 230. If the CND is a CM 235, the MAC address/giaddr tuple data comprises the MAC address of the CM and the giaddr of the CMTS to which it is connected. Referring to FIG. 2B, the CM MAC address/giaddr data from the DHCP request is compared to entries in a datastore 240. A determination is made whether the CM MAC address of the MAC address/giaddr tuple data sent from the DHCP server satisfies matching criteria comprising a same CND MAC address previously associated with a different giaddr 245. If the CM MAC address in the DHCP request has been previously associated with a different giaddr, the DHCP request is evidence that a CM with a duplicate MAC address has been connected to the cable network through a different CMTS and a remedial response is taken 250. The network administrator determines what an appropriate remedial response is. For example, and not as a limitation, the remedial response comprises denying an IP address to the CM, sending an advisory message to a network administrator, or recording the event in a log file.

If the MAC address/giaddr tuple data is unique or if it matches a previously stored tuple, the CM is assigned an IP address from the IP address pool associated with the CMTS. For CMs with MAC addresses for which the DHCP has not previously issued an IP address, the DHCP server will write the MAC address/giaddr tuple data to the datastore 255.

If the CND is a CMAD 260, the MAC address/giaddr tuple data comprises the MAC address of the CMAD, the MAC address of the CM to which the CMAD is connected, and the giaddr of the CMTS to which the CM is connected. Referring to FIG. 2C, the MAC address/giaddr tuple data from the DHCP request is compared to entries in the datastore 265. A determination is made whether the CMAD MAC address of the MAC address/giaddr tuple data sent from the DHCP server satisfies first matching criteria comprising a same CMAD MAC address previously associated with a different giaddr 270. If the CMAD MAC address of the DHCP request has been previously associated with a different giaddr, the DHCP request is evidence that a CMAD with a duplicate MAC address has been connected to the cable network through a different CMTS and a remedial response is taken 275. The network administrator determines what an appropriate remedial response is. For example, and not as a limitation, the remedial response comprises denying an IP address to the CND, sending an advisory message to a network administrator, or recording the event in a log file.

If the CMAD MAC address in the DHCP request is associated with the same giaddr as a stored MAC address/giaddr tuple (i.e., both the CMAD MAC address and the associated giaddr in the DHCP request match those elements of a tuple in the datastore), a determination is made whether the CMAD MAC address in the DHCP request satisfies a second matching criteria comprising a same CMAD MAC address component, a different CM MAC address component, and a same gateway interface address component 280. If both the CMAD MAC and the associated giaddr in the DHCP request match those elements of a tuple in the datastore and the CMAD MAC address is associated with more than one CM MAC address, the DHCP request is evidence that a CMAD with a duplicate MAC address has been connected to the cable network on the same CMTS and a remedial response is taken 275.

If the MAC address/giaddr tuple data is unique or if it matches a previously stored tuple, the CMAD is assigned an IP address from the IP address pool associated with the CMTS. For CMADs with MAC addresses for which the DHCP has not previously issued an IP address, the MAC address/giaddr tuple data is stored in the datastore 285.

In yet another embodiment, the process of detecting duplicate CND MAC addresses is referred to a separate "detection" server for processing, thereby relieving the DHCP of the processing burden. In this embodiment, the detection of a duplicate MAC addresses may occur after an IP address has been assigned to both the CND entitled to use the MAC address and to the CND that has pirated the MAC address. An appropriate remedial response is taken to revoke the IP address of the CND using the pirated MAC address.

Figure 3:
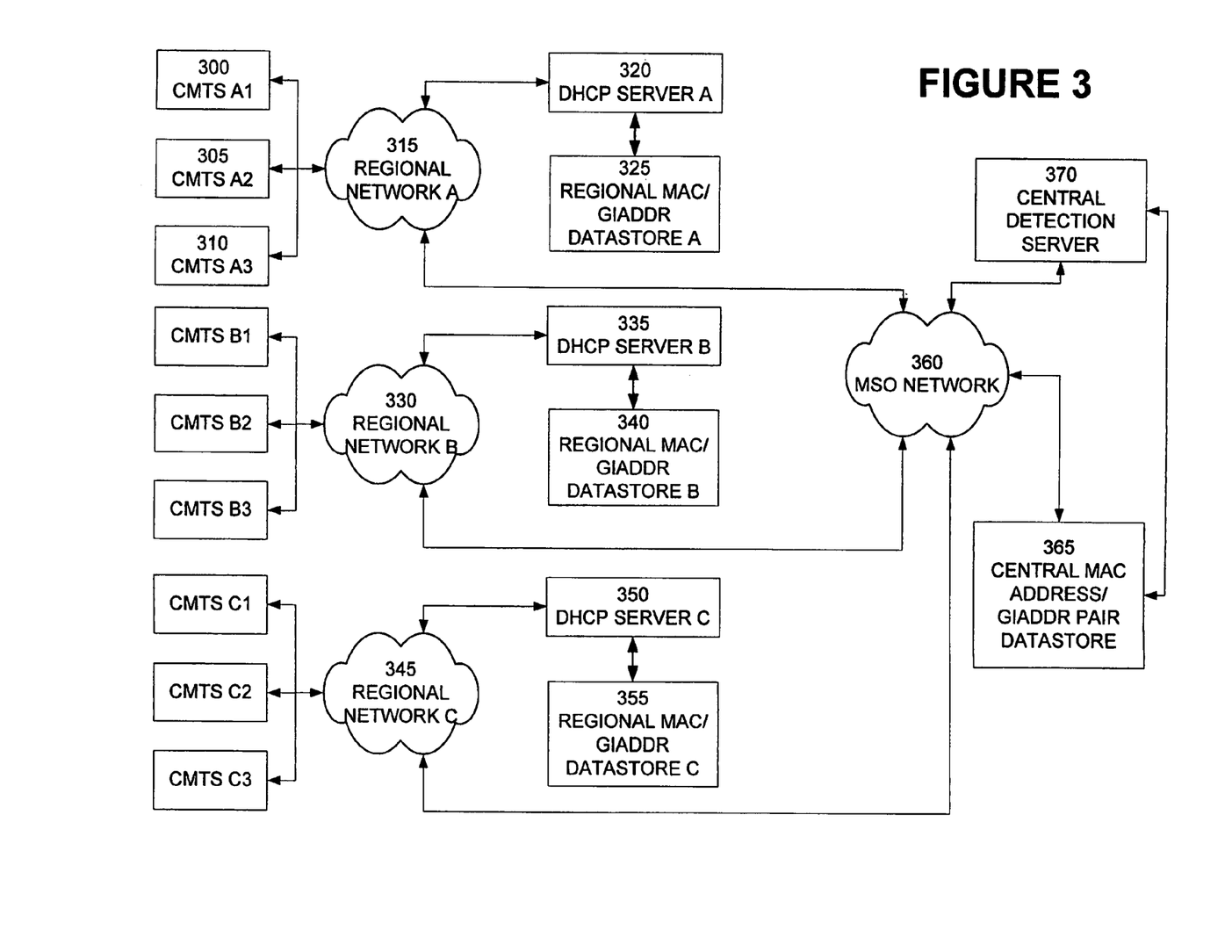
FIG. 3 is a block diagram illustrating an embodiment of the present invention in which duplicate MAC addresses are detected on a plurality of networks using a plurality of CMTSs.

In another embodiment, a cable system comprising multiple networks is served by a datastore. FIG. 3 is a block diagram illustrating an embodiment of the present invention in which duplicate MAC addresses are detected on a plurality of networks using a plurality of CMTSs. For clarity, cable modems, customer premises equipment, the MAC address database and the IP address pool (illustrated in FIG. 1) are not illustrated. Referring to FIG. 3, regional network A 315, regional network B 330 and regional network C 345 each are connected to multiple CMTSs (illustrated for regional network A 315 as CMTS A1 300, CMTS A2 305, and CMTS A3 310). While only three regional networks are illustrated, the present invention is not so limited. Any number of regional networks each connected to any number of CMTSs may be served by the present invention without departing from its scope.

Each regional network is connected to a DHCP server that in turn is connected to a regional datastore comprising MAC address/giaddr tuple data. As illustrated, regional network A 315 is connected to DHCP server A 320, which is connected to regional MAC address/giaddr datastore A 325. Similarly, regional network B 330 is connected to DHCP server B 335 which is connected to regional MAC address/giaddr datastore B 340, and regional network C 345 is connected to DHCP server A 350 which is connected to regional MAC address/giaddr datastore A 355. Additionally, each regional network is connected to a multiple service operator (MSO) network 360. A central MAC address/giaddr datastore 365 is also connected to MSO network 360. A central detection server 370 is linked to each regional network through MSO network 360 and to central MAC address/giaddr datastore 365.

Figure 4:
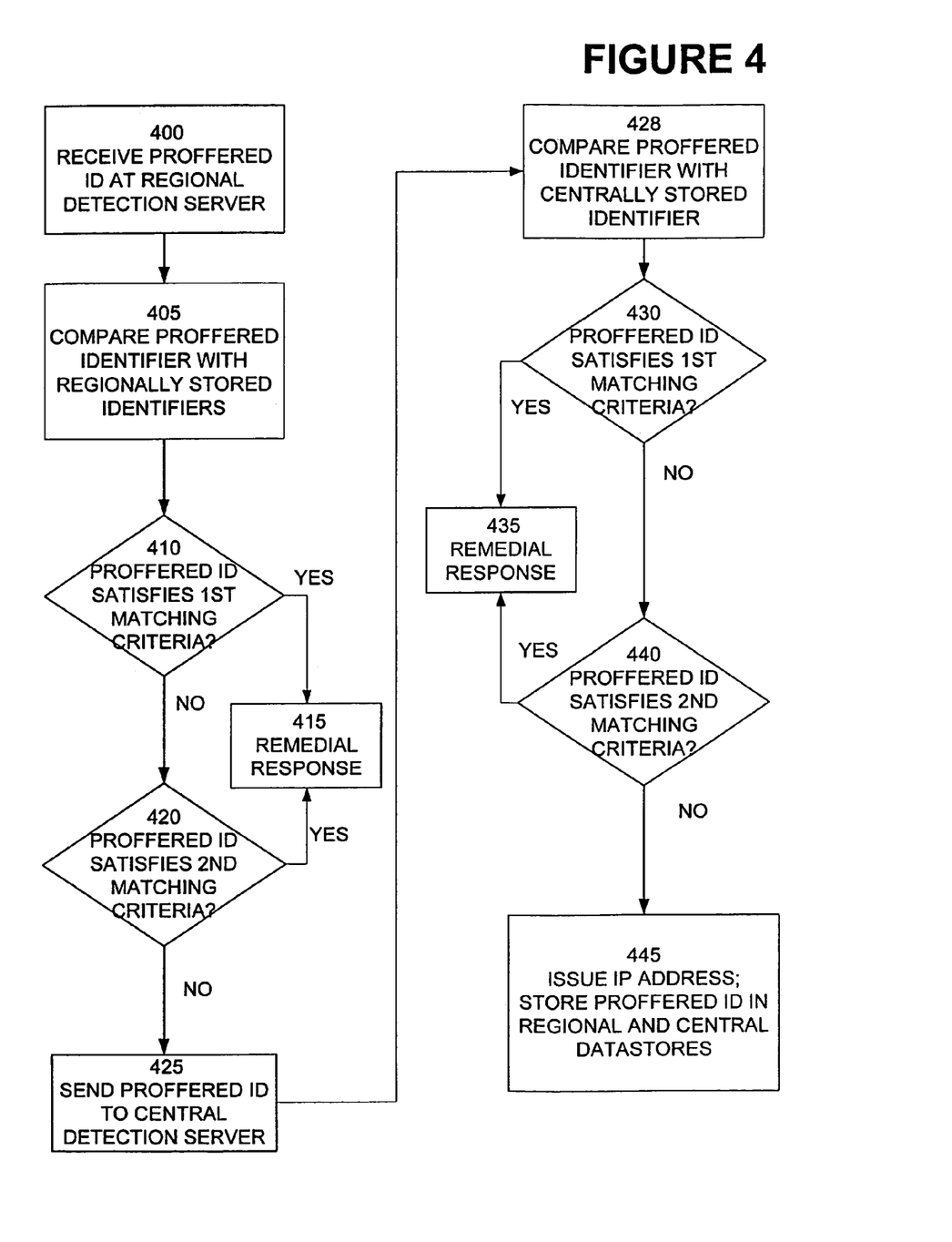
FIG. 4 illustrates a process according to an embodiment of the present invention of detecting duplicate MAC address of a CMAD in a multi-network cable system.

FIG. 4 illustrates a process according to an embodiment of the present invention of detecting a duplicate MAC address of a CMAD in a multi-network cable system. Referring to FIG. 4, the proffered ID is received at a regional detection server 400. In an embodiment of the present invention, the regional detection server is a DHCP server but the invention is not so limited. The proffered identifier is compared with regionally stored identifiers 405 to determine if the proffered ID and any of the regionally stored identifiers satisfy first matching criteria 410 comprising a same CMAD MAC address previously associated with a different giaddr. If the first matching criteria are satisfied, a remedial response is selected 415. If the first matching criteria are not satisfied, a determination is made whether the proffered ID and any of the regionally stored identifiers satisfies a second matching criteria 420 comprising a same CMAD MAC address component, a different CM MAC address component, and a same gateway interface address component. If the second matching criteria are satisfied, a remedial action is selected 415. However, if the proffered ID and the regionally stored identifiers do not satisfy either the first or the second matching criteria, the proffered ID (the MAC address/giaddr tuple) is forwarded to a central detection server 425.

The proffered ID is then compared to centrally stored MAC address/giaddr tuple data gathered from all of the regional datastores 428 to determine whether the proffered ID and any of the centrally stored identifiers satisfy the first matching criteria 430. If the first matching criteria are satisfied, a remedial response is selected 435. If the first matching criteria are not satisfied, a determination is made whether the proffered ID and any of the centrally stored identifiers satisfy the second matching criteria 420. If the second matching criteria are satisfied, a remedial action is selected 435. If the proffered ID and any of the centrally stored identifiers do not satisfy either the first matching criteria or the second matching criteria, an IP address is issued to the CMAD and the proffered ID is stored in both a regional and central datastore 445.

Figure 5:
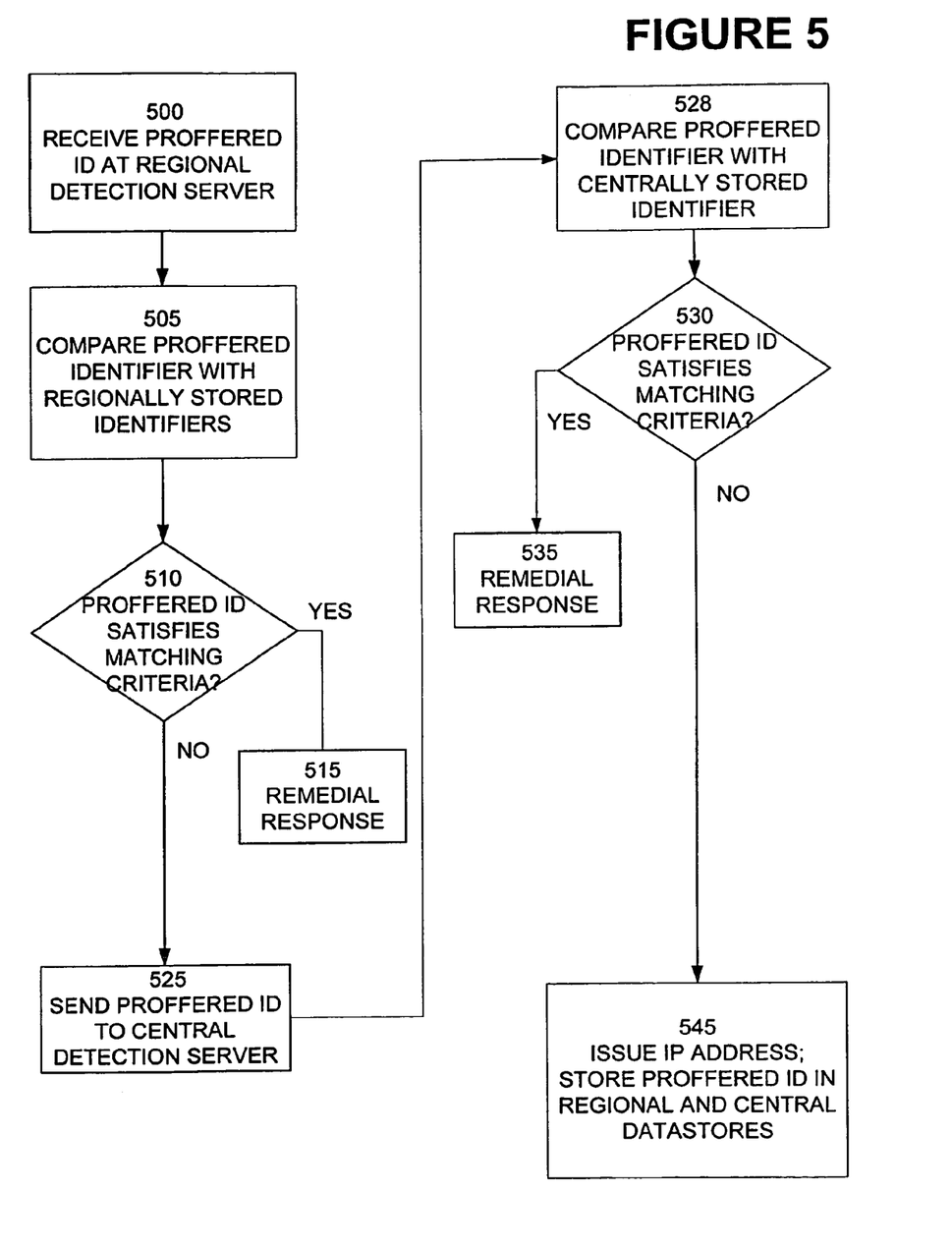
FIG. 5 illustrates a process according to an embodiment of the present invention of detecting duplicate MAC address of a CM in a multi-network cable system

FIG. 5 illustrates a process according to an embodiment of the present invention of detecting a duplicate MAC address of a CM in a multi-network cable system. Referring to FIG. 5, the proffered ID is received at a regional detection server 500. In an embodiment of the present invention, the regional detection server is a DHCP server but the invention is not so limited. The proffered identifier is compared with regionally stored identifiers 505 to determine whether the proffered ID and any of the regionally stored identifiers satisfy matching criteria 510 comprising a same CM MAC address previously associated with a different giaddr. If the matching criteria are satisfied, a remedial response is selected 515. If the matching criteria are not satisfied, the proffered ID (the MAC address/giaddr tuple) is forwarded to a central detection server 525.

The proffered ID is then compared to centrally stored MAC address/giaddr tuple data gathered from all of the regional datastores 528 to determine whether the proffered ID and any of the centrally stored identifiers satisfy the matching criteria 530. If the matching criteria are satisfied, a remedial response is selected 535. If the proffered ID and any of the centrally stored identifiers do not satisfy the matching criteria, an IP address is issued to the CM and the proffered ID is stored in both a regional and central datastore 545.

In another embodiment of the present invention, the CND MAC address/giaddr tuple data is periodically gathered from the CMTS and the MAC address/giaddr tuple data stored in a datastore. If the cable network comprises regional networks, the CMTS and the MAC address/giaddr tuple data is stored regionally and centrally. In this embodiment, a separate process (disassociated from the DHCP server processes) is used to monitor the MAC address/giaddr tuple data in the datastore, to identify duplicate MAC addresses, and to generate alarms for support personnel.

In another embodiment, a MAC address/giaddr datastore is also mined for unusual IP address requests. In this embodiment, MAC addresses that are not found by the DHCP server (rejected MAC addresses) are also stored in the MAC address/giaddr datastore. The rejected MAC addresses are analyzed to determine if a hacker is attempting to find a MAC address within the MAC address database 160 (see FIG. 1). By way of example, and not as a limitation, MAC addresses received by the DHCP server that are incremented sequentially over a short period of time would be flagged as evidence that a hacker was attacking the cable network.

One embodiment of the present invention comprises a method for detecting unauthorized access of a cable system by a cable modem. The cable system comprises a datastore. Alternatives for the datastore include a central database and a distributed database. The method comprises receiving at a cable modem termination system (CMTS) a MAC address proffered by a cable modem seeking access to the cable system, forming a proffered identifier by combining the gateway interface address of the CMTS with the proffered MAC address, and storing the proffered identifier in a datastore.

In other methods of the present invention, a cable system comprises a cable modem termination system (CMTS) and a datastore. Optionally, the cable system may comprise a DHCP server linked to the CMTS. The method for detecting unauthorized access of a cable system by a cable modem comprises receiving at a CMTS a MAC address proffered by a cable modem seeking access to the cable system, forming a proffered identifier by combining the gateway interface address of the CMTS with the proffered MAC address, and comparing components of the proffered identifier to the components of each of one or more identifiers stored in a datastore. A determination is made as to whether the proffered identifier and any of the one or more stored identifiers satisfy a matching criteria comprising a same MAC address component and a different gateway interface address component; and in the event the proffered identifier and any of the one or more stored identifiers satisfy the matching criteria, a remedial response is selected. In another embodiment of the present invention, the DHCP server makes the determination with respect to the matching criteria. In other methods of the present invention, in the event the proffered identifier and any of the one or more stored identifiers do not satisfy the matching criteria, the proffered identifier is stored in the datastore.

In yet another method of the present invention, a cable system comprises a plurality of regional cable networks, each with at least one CMTS, a regional datastore, and a central datastore. The central datastore comprises regionally stored identifiers from each of the regional datastores. A method detecting unauthorized access of a cable system by a cable modem comprises receiving at a CMTS a MAC address proffered by a cable modem seeking access to the one of the plurality of regional cable networks. A proffered identifier is formed by combining the gateway interface address of the CMTS with the proffered MAC address. The components of the proffered identifier are compared to the components of each of one or more identifiers stored in a regional datastore. A first determination is made as to whether the proffered identifier and any of the one or more regionally stored identifiers satisfy matching criteria comprising a same MAC address component and a different gateway interface address component. In the event the proffered identifier and any of the one or more stored identifiers satisfy the matching criteria, a remedial response is selected. In the event the proffered identifier and any of the one or more regionally stored identifiers do not satisfy the matching criteria, the components of the proffered identifier are compared to the components of each of one or more stored identifiers stored in a central datastore. A second determination is made as to whether the proffered identifier and any of the one or more centrally stored identifiers satisfy the matching criteria. In the event the proffered identifier and any of the one or more centrally stored identifiers satisfy the matching criteria, a remedial response is selected. The method further comprises, in the event the proffered identifier and any of the one or more centrally stored identifiers do not satisfy the matching criteria, storing the proffered identifier in the regional datastore and the central datastore.

In yet another embodiment of the present invention, a cable system comprises a datastore. The datastore comprises one or more rejected MAC addresses. A method for detecting unauthorized access of a cable system by a cable modem comprises receiving a MAC address proffered by a cable modem seeking access to the cable system and further comprises comparing the proffered MAC address to each of one or more stored rejected MAC addresses in a datastore. A determination is made as to whether the proffered MAC address and any of the one or more rejected MAC addresses are related. Rejected MAC addresses may be related temporally, sequentially, or by manufacturer code. In the event the proffered MAC address and any of the one or more rejected MAC addresses are related, a remedial response is selected.

In an embodiment of the present invention, a system for detecting unauthorized access of a cable network by a cable modem comprises a CMTS and a detection server that are linked to a datastore. The CMTS is adapted to receive a MAC address of a CM seeking access to the cable system and to form a proffered identifier by combining a gateway interface address of the CMTS with the MAC address. The detection server is adapted to receive the proffered identifier from the CMTS and to compare the components of the proffered identifier to the components of each of one or more stored identifiers stored in the datastore. The detection server is further adapted to determine whether the proffered identifier and any of the one or more stored identifiers satisfy matching criteria comprising a same MAC address component and a different gateway interface address component. In the event the proffered identifier and any of the one or more stored identifiers satisfy the matching criteria, the detection server is adapted to select a remedial response. In the event the proffered identifier and any of the one or more stored identifiers do not satisfy the matching criteria, the detection server is further adapted to store the proffered identifier in the datastore.

In another embodiment of the present invention, a cable network comprises a plurality of regional cable networks, each having one or more CMTSs, a regional datastore linked to a regional detection server, and a central datastore linked to a central detection server. The central datastore comprises regionally stored identifiers from each of the regional datastores. The CMTS is adapted to receive a MAC address of a cable modem seeking access to one of the plurality of regional networks and to form a proffered identifier by combining a gateway interface address of the CMTS with the MAC address. A regional detection server is adapted to receive the proffered identifier from the CMTS and to compare the components of the proffered identifier to the components of each of one or more stored identifiers stored in a regional datastore. The regional detection server is further adapted to determine whether the proffered identifier and any of the one or more regionally stored identifiers satisfy matching criteria comprising a same MAC address component and a different gateway interface address component. In the event the proffered identifier and any of the one or more regionally stored identifiers satisfy the matching criteria, the regional detection server is adapted to select a remedial response. In the event that the proffered identifier and any of the one or more regionally stored identifiers do not satisfy the first matching criteria, the regional detection server is adapted to send the proffered identifier to a central detection server. The central detection server is adapted to compare the components of the proffered identifier to the components of each of one or more stored identifiers stored in a central datastore. The central detection server is also adapted to determine whether the proffered identifier and any of the one or more centrally stored identifiers satisfy the matching criteria. In the event the proffered identifier and any of the one or more centrally stored identifiers satisfy the matching criteria, the central detection server is adapted to select a remedial response. In the event the proffered identifier and any of the one or more centrally stored identifiers do not satisfy the matching criteria, the central detection server is also adapted to store the proffered identifier in the regional datastore and the central datastore.

In other methods of the present invention, a cable system comprises a CMTS and a datastore. A method for detecting unauthorized access of a cable system by a cable modem comprises receiving at a CMTS a MAC address. A proffered identifier is formed by combining the gateway interface address of the CMTS with the proffered MAC address. The proffered identifier is compared to preauthorized identifiers in a datastore. In the event the proffered identifier matches a preauthorized identifier, the cable modem is granted temporary access to the cable system and a confirmation identifier is requested from the cable modem. In the event the confirmation identifier is received from the cable modem, the cable modem is granted access to the cable system.

A system and the methods for detecting and reporting cable network devices with duplicate media access control addresses have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the, " is not to be construed as limiting the element to the singular.

What is claimed is:

1. A method for detecting unauthorized access of a cable system by a cable network device (CND), the method comprising:
    receiving at a cable modem termination system (CMTS) a DHCP request from a CND seeking access to the cable system, wherein the DHCP request comprises a MAC address;
    forming a proffered identifier by combining the gateway interface address of the CMTS with the proffered MAC address;
    comparing the proffered identifier to preauthorized identifiers in a datastore;
    granting the CND temporary access to the cable system when the proffered identifier matches one of the preauthorized identifiers;
    requesting from the CND a confirmation identifier;
    comparing the CND confirmation identifier sent from the CND to confirmation identifiers stored in the datastore; and
    granting the CND access to the cable system when the confirmation identifier matches one of the stored confirmation identifiers.

2. The method of claim 1 further comprising selecting a remedial response when the proffered identifier does not match a preauthorized identifier.

3. The method of claim 2, wherein the remedial response is selected from the group consisting of denying the CND access to the network, sending an advisory message to a network administrator, and recording a proffered identifier in a log file.

4. The method of claim 1, wherein the preauthorized identifiers are MAC address-gateway interface address tuples of authorized CNDs.

5. The method of claim 1, wherein the datastore comprises a central database.

6. The method of claim 1, wherein the datastore comprises a distributed database.

7. The method of claim 1, wherein the cable system comprises a DHCP server linked to the CMTS and wherein the comparing the proffered identifier to preauthorized identifiers in a datastore and the comparing the CND confirmation identifier sent from the CND to confirmation identifiers stored in the datastore are performed by the DHCP server.

8. The method of claim 1, wherein the cable system comprises a detection server linked to the CMTS and wherein the comparing the proffered identifier to preauthorized identifiers in a datastore and the comparing the CND confirmation identifier sent from the CND to confirmation identifiers stored in the datastore are performed by the detection server.

9. A system for detecting unauthorized access of a cable system by a cable network device (CND) comprising:
    a CND seeking access to the cable network;
    a CMTS, wherein the CMTS is configured for:
        receiving a DHCP request comprising a MAC address of the CND seeking access to the cable network; and
        forming a proffered identifier by combining a gateway interface address of the CMTS with the CND MAC address; and
    a detection server linked to a datastore, wherein the detection server is configured for:
        receiving the proffered identifier from the CMTS;
        comparing the proffered identifier to preauthorized identifiers in a datastore;
        granting the CND temporary access to the cable system when the proffered identifier matches one of the preauthorized identifiers;
        requesting from the CND a confirmation identifier;
        comparing the CND confirmation identifier sent from the CND to confirmation identifiers stored in the datastore; and
        granting the CND access to the cable system when the confirmation identifier matches one of the stored confirmation identifiers.

10. The system of claim 9 further comprising selecting a remedial response when the proffered identifier does not match a preauthorized identifier.

11. The system of claim 10, wherein the remedial response is selected from the group consisting of denying the CND access to the network, sending an advisory message to a network administrator, and recording a proffered identifier in a log file.

12. The system of claim 9, wherein the preauthorized identifiers are MAC address-gateway interface address tuples of authorized CNDs.

13. The system of claim 9, wherein the datastore comprises a central database.

14. The system of claim 9, wherein the datastore comprises a distributed database.

15. The system of claim 9, wherein the detection server comprises a DHCP server.

* * * * *